(12) United States Patent
Brooks et al.

(10) Patent No.: US 8,196,862 B2
(45) Date of Patent: Jun. 12, 2012

(54) COLD FUEL COOLING OF INTERCOOLER AND AFTERCOOLER

(75) Inventors: Alexander Nelson Brooks, Pasadena, CA (US); James Gallagher Daley, Ventura, CA (US); Bart Dean Hibbs, Simi Valley, CA (US)

(73) Assignee: AeroVironment Inc., Monrovia, CA (US)

( * ) Notice: Subject to any disclaimer, the term of this patent is extended or adjusted under 35 U.S.C. 154(b) by 464 days.

(21) Appl. No.: 12/586,631

(22) Filed: Sep. 23, 2009

(65) Prior Publication Data

US 2010/0192890 A1 Aug. 5, 2010

Related U.S. Application Data

(60) Provisional application No. 61/194,103, filed on Sep. 23, 2008.

(51) Int. Cl.
*B64D 27/00* (2006.01)
(52) U.S. Cl. ............. 244/59; 244/53 R; 123/559.1; 123/563
(58) Field of Classification Search ............ 244/59, 244/53 R, 53 B; 123/559.1, 563, 434, 562; 60/609
See application file for complete search history.

(56) References Cited

U.S. PATENT DOCUMENTS

| | | | |
|---|---|---|---|
| 2,233,031 A * | 2/1941 | Price | ............... 60/686 |
| 4,395,995 A | 8/1983 | Crain | |
| 4,505,124 A * | 3/1985 | Mayer | ............ 62/180 |
| 4,523,548 A | 6/1985 | Engel et al. | |
| 5,081,977 A | 1/1992 | Swenson | |
| 5,298,054 A | 3/1994 | Malik | |
| 5,375,580 A | 12/1994 | Stolz et al. | |
| 5,390,636 A | 2/1995 | Baylor et al. | |
| 5,390,646 A | 2/1995 | Swenson | |
| 5,438,961 A | 8/1995 | Peschka et al. | |
| 6,050,080 A | 4/2000 | Horner | |
| 6,155,212 A | 12/2000 | McAlister | |
| 6,182,643 B1 | 2/2001 | Canopy | |
| 6,516,615 B1 | 2/2003 | Stockhausen et al. | |
| 6,796,131 B2 | 9/2004 | Sampson | |
| 6,951,211 B2 | 10/2005 | Bryant | |
| 7,281,527 B1 | 10/2007 | Bryant | |
| 7,281,531 B1 | 10/2007 | Fulton et al. | |
| 7,942,117 B2 * | 5/2011 | Robinson | ................. 123/68 |

(Continued)

OTHER PUBLICATIONS

"International Search Report and the Written Opinion of the International Search Authority" mailed Jun. 8, 2010, of counterpart PCT application PCT/US09/05314.

(Continued)

*Primary Examiner* — Christopher P Ellis
(74) *Attorney, Agent, or Firm* — Eric J. Aagaard, Esq.; The Law Office of John A. Griecci

(57) ABSTRACT

A high-altitude aircraft powerplant including an engine, a two-stage turbocharger having an intercooler and an aftercooler, a cryogenic hydrogen fuel source, and a cooling system including a hydrogen heat exchanger. Aided by a ram-air cooler that cools a coolant to a near-ambient temperature, the heat exchanger is configured to heat the hydrogen using the coolant, and to cool the coolant to a temperature well below the ambient temperature during high-altitude flight. The intercooler and aftercooler use the sub-ambient temperature coolant, as does a separate sensor. The ram-air cooler includes a front portion and a rear portion. The cooling system includes three cooling loops which respectively incorporate only the front portion, only the rear portion, and both portions of the ram-air cooler.

12 Claims, 5 Drawing Sheets

U.S. PATENT DOCUMENTS

| | | | |
|---|---|---|---|
| 8,078,385 B2 * | 12/2011 | Vetrovec | 701/103 |
| 2002/0152754 A1 * | 10/2002 | MacKay | 60/772 |
| 2004/0177837 A1 | 9/2004 | Bryant | |
| 2006/0168958 A1 | 8/2006 | Vetrovec | |
| 2008/0006743 A1 | 1/2008 | Miller et al. | |
| 2008/0167791 A1 | 7/2008 | Fulton et al. | |
| 2009/0259388 A1 * | 10/2009 | Vetrovec | 701/103 |
| 2010/0100300 A1 * | 4/2010 | Brooks et al. | 701/102 |
| 2011/0252796 A1 * | 10/2011 | Burkhart | 60/641.2 |

OTHER PUBLICATIONS

Sadiq Al-Baghdadi, Maher A. R.; Shahad Al-Janabi, Haroun A. K., "A Prediction Study of a Spark Ignition Supercharged Hydrogen Engine" (Abstract only), Energy Conversion and Management, 2003, vol. 44, No. 20. Abstract printed from http://cat.inist.fr/?aModele=afficheN&cpsidt=15062964.

White, C.M., Steeper, R.R., and Lutz, A.E., "The Hydrogen-fueled Internal Combustion Engine: a Technical Review" (Abstract only), International Journal of Hydrogen Energy, Aug. 2006, vol. 31, Issue 10. Abstract printed from http://www.sciencedirect.com.

Halmari, Jaakko J., "Computer Simulations of a Hydrogen Fueled Internal Combustion Engine," Thesis in partial fulfillment of requirements for a Master of Science in Mechanical Engineering, Texas Tech University. May 2005.

* cited by examiner

COLD FUEL COOLING OF INTERCOOLER AND AFTERCOOLER

This application claims the benefit of U.S. provisional Application No. 61/194,103, filed Sep. 23, 2008, which is incorporated herein by reference for all purposes.

The present invention relates generally to an aircraft powerplant thermal management systems and, more particularly, to an aircraft powerplant configured to use a vaporized cryogenic liquid fuel to cool various components using below-ambient temperature coolant.

BACKGROUND OF THE INVENTION

Aircraft powerplants typically need to consume ambient air for the oxygen to react with the hydrogen fuel. At high altitude, air is very low in pressure and density, and must typically be compressed in order to be usable in a powerplant. The power required for this compression can be a significant fraction of the gross output power of the powerplant, so it is important to minimize the power needed for compression so as to minimize the impact on overall system efficiency.

Air pressurization for internal combustion engines is most efficiently accomplished using one or more turbochargers. A turbocharger is a combination of turbine driven by engine exhaust gases and an inlet air compressor driven by the turbine.

In the case where the powerplant is based on a hydrogen internal combustion engine, the air-to-hydrogen mass flow ratio is typically about 70:1. The engine torque is approximately proportional to the amount of hydrogen burned per engine revolution. The amount of air taken in by the engine is proportional to the density of the air fed to the intake manifold. Thus, achieving a desired torque level requires achieving a certain intake air density.

Air density is proportional to pressure divided by temperature. The requisite density can be achieved by any of suitable combination of pressure and temperature. A higher temperature means higher pressure is needed to achieve a desired density, thus, it is known to use an intercooler (e.g., a heat exchanger after the first of two compressors) to cool air after a first compression, and an aftercooler (e.g., a heat exchanger after the second compressor) to cool it again after a second compression.

The more effective at cooling these coolers are, the less energy is expended in compressing the air. However, extensive air cooling devices may cause a pressure drop, counteracting the benefits of the compressor. Thus, it is desirable to maximize the cooling capability of a cooler while minimizing its pressure drop. Typically, the temperature of the coolant used to cool an intercooler or an aftercooler is limited to the ambient temperature of the surrounding air.

Accordingly, there has existed a need for an aircraft powerplant that can provide highly efficient cooling to compressed air, and to other devices needing efficient cooling. Preferred embodiments of the present invention satisfy these and other needs, and provide further related advantages.

SUMMARY OF THE INVENTION

In various embodiments, the present invention solves some or all of the needs mentioned above, offering a powerplant having a highly efficient cooling system.

The powerplant of present invention is configured for use in a range of flight conditions, and typically includes a power converter, a cryogenic source of fuel for use by the power converter to produce usable energy, a fuel heat exchanger, a source of low-pressure oxidizer for use by the power converter, a first compressor for the oxidizer, and a first-compressor heat exchanger. The fuel source is configured to provide the fuel at a temperature below ambient temperatures over the range of flight conditions. The fuel heat exchanger is configured to heat fuel from the fuel source, and thereby cool a coolant to temperature below the ambient temperature.

One way to efficiently achieve better intercooler and aftercooler cooling is by using a colder coolant. Advantageously, the first-compressor heat exchanger is configured to use the coolant at the sub-ambient temperature from the fuel heat exchanger to cool the oxidizer intermediate the first compressor and the power converter along the oxidizer flow path. This provides for a reduction in the power consumed by the air compression system for a high altitude engine, such as one that burns hydrogen gas that is boiled off from a liquid hydrogen tank. Moreover, if a subsequent high-pressure compressor is also used, the colder air will reduce its corrected mass flow, reducing its power needs and/or its size and weight. Thus there is a unique synergy between the cooling needs of an intercooler and the warming needs of the hydrogen fuel.

The powerplant typically further includes a second compressor intermediate the first-compressor heat exchanger and the power converter, along the flow path of the oxidizer. The second compressor is configured to further compress oxidizer from first-compressor heat exchanger prior to use by the power converter. A second-compressor heat exchanger is also configured to use the coolant from the fuel heat exchanger at the sub-ambient temperature. It cools the oxidizer intermediate the second compressor and the power converter along a flow path of the oxidizer. This reduces the pressure required to achieve the desired density of air fed to the engine, and thereby reduces the compression work required. Thus there is a unique synergy between the cooling needs of an aftercooler and the warming needs of the hydrogen fuel.

To aid in lowering the temperature of the coolant, a ram-air heat exchanger upstream of the fuel heat exchanger is configured to cool the coolant to a temperature that is just above ambient temperature.

The ram air heat exchanger includes a front ram-air heat exchanger and a rear ram-air heat exchanger downstream of the front ram-air heat exchanger along a ram-air passageway. The front ram-air heat exchanger is downstream of the rear ram-air heat exchanger along a heat-exchanger coolant passageway such that the front ram-air heat exchanger is configured to further cool coolant received from the rear ram-air heat exchanger.

The cooling system includes three cooling loops with thermal loads. These three loops respectively incorporate only the front portion, only the rear portion, and both portions of the ram-air cooler. Advantageously, this efficiently allows for the heat sinks and sources to operate in their best temperature ranges, while sharing the work for coolant flows of a similar temperature.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in an aircraft powerplant including a power converter, such as an internal combustion engine, that is configured to produce energy from a fuel and an oxidizer. The powerplant uses a two-stage turbocharging system including an intercooler and an aftercooler. The powerplant is provided with a cryogenic fuel source (e.g., a cryogenic hydrogen tank) providing fuel for the engine at below ambient temperatures.

A powerplant cooling system includes a fuel heater in the form of a heat exchanger configured to heat fuel from the source of fuel, and to cool a coolant to a temperature that is below the ambient temperature. This provides for the coolant to be used to by the intercooler and aftercooler for significant cooling without causing a significant pressure drop, thereby reducing the compression power needed by the compressors of the two turbocharger stages.

The benefits of reducing the required compression power are realized indirectly. Energy is extracted from the engine exhaust by flowing hot exhaust gases through the turbine stages of the turbochargers. This provides the power to drive the compression stages. If the needed compression power is reduced, then less power needs to be extracted by the turbine stages. This in turn means that the turbine pressure ratios will be lower, and consequently the back pressure to the engine will be lower. Typically a 4-5 pisa lower intake pressure is anticipated.

Reduced back pressure means an increased difference between the intake and exhaust pressure of the engine. Differences between intake and exhaust pressure account for the pumping loss (which is a torque loss when exhaust pressure is greater than the intake pressure) or pumping gain (which is a torque gain when the intake pressure is greater than the exhaust pressure). Thus, reducing the required compressor power through the use of hydrogen-cooled coolant results in a reduced back pressure, and thereby, a torque gain of the engine.

Powerplant Two-Stage Air Compression System

Figure 1:
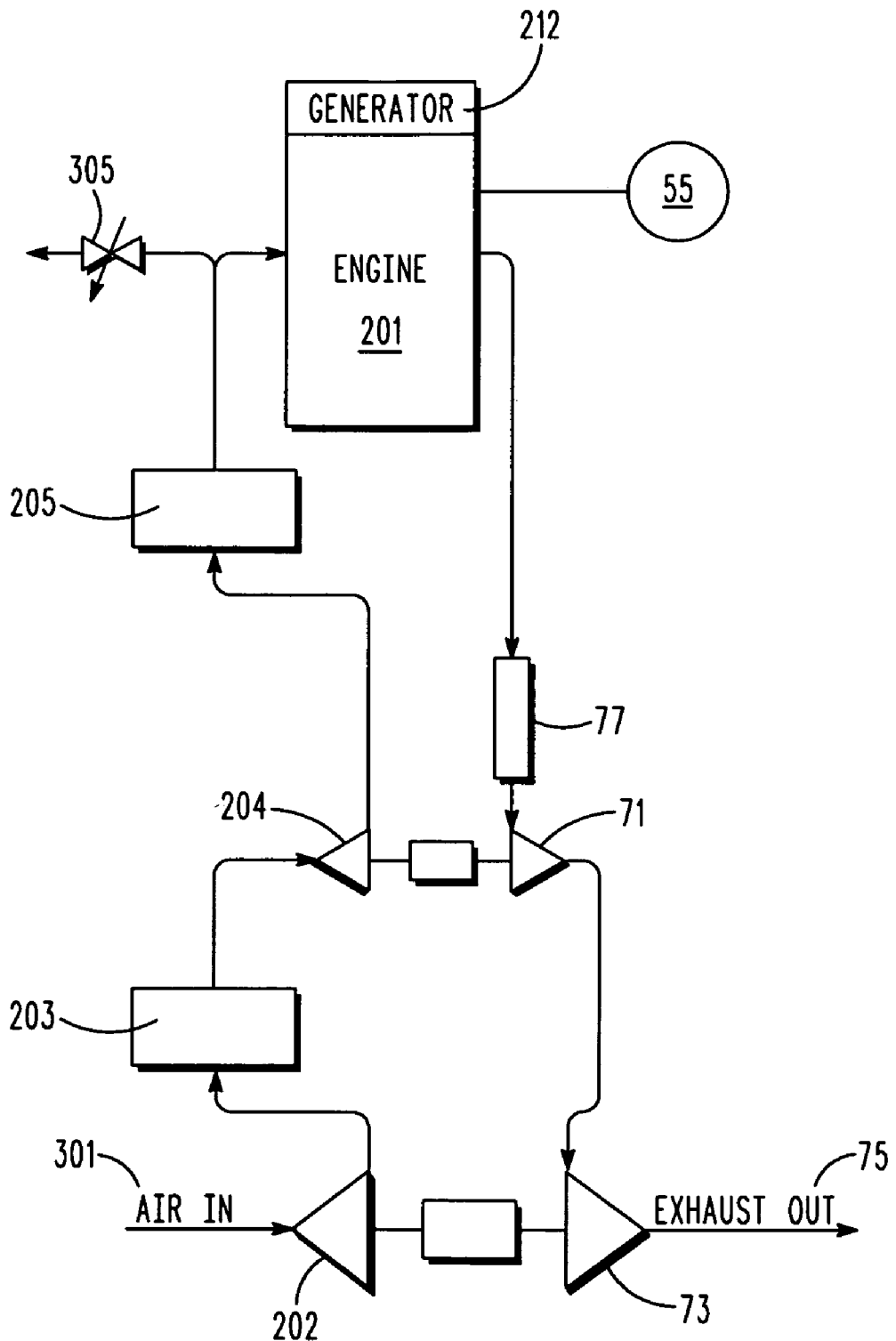
FIG. 1 is a system layout of a powerplant two-stage air compression system for a first embodiment of a powerplant under the invention.

With reference to FIG. 1, the powerplant of the first embodiment includes a power generation system including an internal combustion piston engine 201 that drives a generator 212. In alternative embodiments the power generator could be an engine that directly drives a mechanical system such as a propeller system, or a fuel cell. The powerplant also includes a control system 55 configured to control the operation of the powerplant over an envelope of operating conditions (e.g., over a range of power generation requirements), over a range of operating conditions (e.g., temperatures and pressures throughout the powerplant), and over a range of ambient conditions that can range from sea-level temperatures and pressures to stratospheric conditions.

As an oxidizer, the engine uses ambient air received in a first air scoop 301, and that is first compressed in a first-turbocharger compressor 202 and cooled in an intercooler 203, and then compressed in a second-turbocharger compressor 204 and cooled in an aftercooler 205. Engine exhaust is used to power the first and second turbochargers. More particularly, the engine exhaust is first used to energize a second-turbocharger turbine 71, which drives the second-turbocharger compressor 204, and then to energize a first-turbocharger turbine 73, which drives the first-turbocharger compressor 202, before being exhausted to the atmosphere 75. Optionally, an afterburner 77 may be used to add energy to the exhaust stream, and thereby into the turbines.

The engine 201, the first compressor 202 and the second compressor 204 are all significant sources of heat. Compressed airstreams carry the heat from the compressors to the intercooler 203 and aftercooler 205, which remove a significant part of that heat, but must in turn be cooled. To efficiently cool these powerplant components, along with other items needing cooling, the powerplant has a cooling system tailored to cool the different devices with an efficient level of cooling.

Cooling System

In the following description consecutive reference numbers are used to represent system components of similar types. For example, reference numerals 111-113 represent various portions of a hydrogen pathway. Reference numerals in the 100s represent various pathways. Reference numerals in the 200s represent various heat sources and heat sinks. Reference numerals in the 300s represent sources and sinks of substances, such as air or hydrogen.

Figure 2:
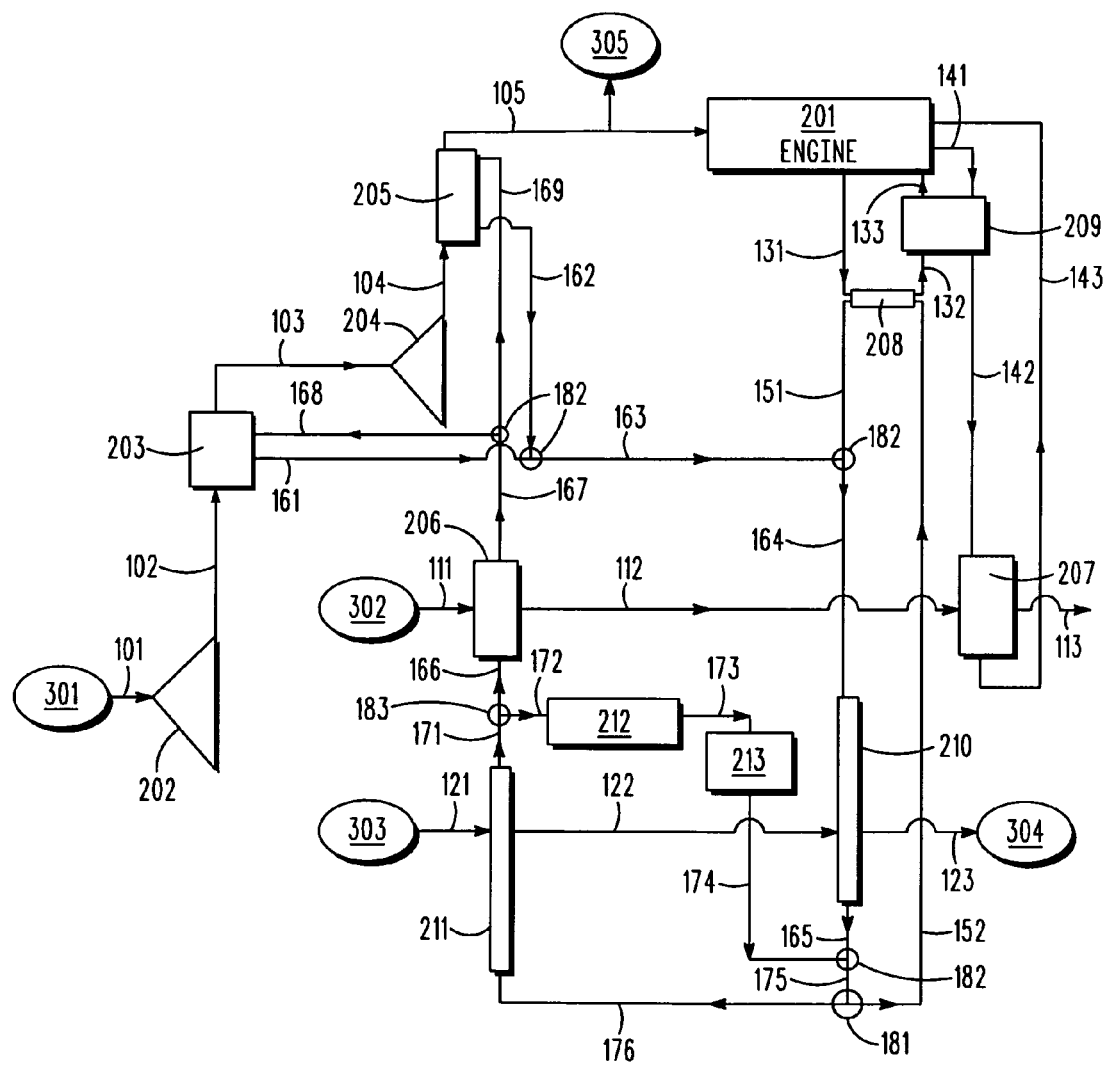
FIG. 2 is a system layout of a cooling system for the embodiment partially depicted in FIG. 1.

The engine 201 of this embodiment uses a hydrogen fuel and, as previously noted, ambient air as an oxidizer. With reference to FIG. 2, as previously indicated, incoming ambient air from the first air scoop 301 is received in a compressor inlet 101 of the first-turbocharger compressor 202. The first-turbocharger compressor pumps once-compressed air into a once-compressed air passageway 102, which leads to the intercooler 203. The intercooler cools the once-compressed air using a coolant that is substantially colder than the ambient air in which the power plant is operating. This extremely cold coolant provides for a substantial cooling ability without causing a significant pressure drop.

Once-cooled air emerges from the intercooler 203 and passes through a once-cooled air passageway 103 to the second-turbocharger compressor 204. The second-turbocharger compressor pumps twice-compressed air into a twice-compressed air passageway 104, which leads to the aftercooler 205. Similar to the intercooler, the aftercooler cools the twice-compressed air using a coolant that is substantially colder than the ambient air in which the power plant is operating, again, without causing a significant pressure drop. Twice-cooled air emerges from the aftercooler 205 and passes through a twice-cooled air passageway 105 to an inlet of the engine 201.

The hydrogen fuel for the present embodiment is boiled off from liquid hydrogen in a cryogenic hydrogen tank, and is extremely cold (on the order of −220 C). In order to be compatible with typical hydrogen fuel injectors, the hydrogen temperature must be raised by about 200 C up to about −20 C. The heat needed to warm the hydrogen can readily be derived from waste heat from the engine. This waste heat can be tapped at several different locations in the system. Some points for extracting waste heat have synergistic benefits that result from the transfer of heat to the hydrogen from one of the waste heat sources. These benefits can improve the overall efficiency of the powerplant.

Incoming boiled-off cryogenic hydrogen from a hydrogen source 302 such as a cryogenic tank passes through a hydrogen input line 111 to a first hydrogen heater 206. The first hydrogen heater heats the cold hydrogen gas. Once-heated hydrogen emerges from the first hydrogen heater 206 and passes through a once-heated hydrogen line 112 to a second hydrogen heater 207. The second hydrogen heater again heats the once-heated hydrogen gas. Advantageously, the second hydrogen heater can be used by the control system to provide adequate hydrogen heating (such that the injectors will operate properly) in situations where the intercooler and aftercooler do not provide enough heat to adequately heat the hydrogen. Twice-heated hydrogen emerges from the second hydrogen heater and passes through a twice-heated hydrogen line 113, which leads (not shown) to the engine 201.

During powerplant operation, the engine 201 (via an engine-coolant heat exchanger 208), the first-turbocharger compressor 202 (via the intercooler 203), and the second-turbocharger compressor 204 (via the aftercooler 205) are all potentially substantial heat sources. Additional heat sources may include the generator 212, and various payloads 213 that the aircraft may be carrying.

In addition to the first hydrogen heater 206 and the second hydrogen heater 207, other significant heat sinks include a front ram-air heat exchanger 211 and a rear ram-air heat exchanger 210. Incoming ambient ram-air from a second, ram-air scoop 303 is received in a ram-air inlet 121 of the front ram-air heat exchanger 211. Once-heated air emerges from the front ram-air heat exchanger 211 and passes through a once-heated ram-air passageway 122 to the rear ram-air heat exchanger 210. Twice-heated air emerges from the rear ram-air heat exchanger 210 and passes through a twice-heated ram-air passageway 123 to become exhaust air exhausted by the aircraft to the atmosphere 304, or used by other portions of the aircraft that require warmed air.

The cooling system includes three separate and distinct networks of cooling fluid passageways. Each network operates using a distinct cooling fluid appropriate for the thermal requirements of its respective network. The first network is the primary powerplant-cooling network, which operates using a cooling fluid that can operate at low temperatures, such as DYNALENE®. The second network is the engine cooling loop, which uses an appropriate cooling fluid such as glycol. The third network is the engine-oil cooling loop, which uses engine oil as its cooling fluid. The three networks thermally interact, and the control system 55 controls the operation of each network to maximize the efficient operation of the powerplant.

With respect to the engine cooling loop, when the engine 201 is in operation, it dissipates a significant amount of heat into its cooling fluid, which is pumped through a engine-heated-coolant passageway 131 to the engine-coolant heat exchanger 208. The engine-coolant heat exchanger cools 208 the engine-heated engine coolant, and passes it through a cooled engine coolant passageway 132 to a coolant-oil heat exchanger 209, in which it is used to draw heat from the engine-oil cooling loop. The coolant-oil heat exchanger 209 passes the oil-warmed engine coolant through an oil-warmed passageway 133 and back to the engine 201.

With respect to the engine-oil cooling loop, the engine 201 also dissipates heat into its oil, and it pumps engine-heated oil through a engine-heated-oil passageway 141 to the coolant-oil heat exchanger 209 that was previously discussed. The coolant-oil heat exchanger cools the engine-heated oil and passes once-cooled oil through a once-cooled oil passageway 142 to the second hydrogen heater 207. The remaining engine heat in the once-cooled oil is the heat used by the second hydrogen heater 207 to warm the once-heated hydrogen for use by the engine, as was discussed above. The second hydrogen heater 207 passes twice-cooled oil through a twice-cooled oil passageway 143 and back to the engine 201.

Unlike the second and third networks of cooling fluid passageways, the primary network is not a simple cooling loop with all elements in series. Instead, the primary network is a series of cooling loops that partially overlap. As a result, there are locations in which cooling fluid is received from two or more thermally distinct sources. The system is typically designed such that coolant streams that combine from different sources are close to the same temperature.

To simplify the description of the primary cooling network, it will be described as a composite of three separate cooling loops. The three cooling loops are discussed below as if the actual fluid remains in the same loop even when mixed with another loop and then separated back out again, but it should be understood that this is not the case.

The first primary-network cooling loop is the engine-heat cooling loop. In the engine-heat cooling loop, the engine-coolant heat exchanger 208 heats primary-network coolant and passes it into a hot engine-heat coolant passageway 151 that extends to the rear ram-air heat exchanger 210, partially overlapping with another cooling loop, as will be described below. The rear ram-air heat exchanger 210 cools the hot engine-heat coolant from the engine-coolant heat exchanger 208 and passes it on to a cooled engine-heat coolant passageway 152, which partially overlaps with other cooling loops, as will be described below. The cooled engine heat coolant passageway 152 extends from the rear ram-air heat exchanger 210 back to the engine-coolant heat exchanger 208, providing the cooled engine-heat coolant to the engine-coolant heat exchanger 208.

The second primary-network cooling loop is the compressor-coolers cooling loop. Technically, the compressor-coolers cooling loop is two separate cooling loops that completely overlap with the exception of the intercooler 203 and aftercooler 205. However they will be discussed as a single loop in which the two separate coolers are cooled in parallel.

In the compressor-coolers cooling loop, the intercooler 203 passes hot intercooler coolant through a hot-intercooler coolant passageway 161, and the aftercooler 205 passes hot aftercooler coolant through a hot-aftercooler coolant passageway 162. The hot-intercooler passageway 161 and hot-aftercooler passageway 162 join and intermix their contents to form a hot compressor-cooler passageway 163. The hot compressor-cooler passageway 163 then joins and intermixes with the hot engine-heat coolant passageway 151 (as mentioned above) to overlap and form a rear-ram-air heat-exchanger input passageway 164 leading to the rear ram-air heat exchanger 210.

The rear ram-air heat exchanger 210 cools the hot compressor-cooler coolant from the intercooler 203 and aftercooler 205 and passes once-cooled compressor-cooler coolant on to a once-cooled compressor-cooler coolant passageway 165, which initially overlaps with the cooled engine-heat coolant passageway 152, and then partially overlaps with multiple combinations of cooling loops to lead to the front ram-air heat exchanger 211, as will be described below. The front ram-air heat exchanger 211 is cooled by air that is colder than the air cooling the rear ram-air heat exchanger 210. Adding to the cooling effect of the rear ram-air heat exchanger 210, the front ram-air heat exchanger 211 cools the once-cooled compressor-cooler coolant to a temperature above, but relatively close to ambient temperature, and then passes the twice-cooled compressor-cooler coolant on to a twice-cooled compressor-cooler coolant passageway 166, which initially overlaps with another cooling loop, as will be described below.

The twice-cooled compressor-cooler coolant passageway 166 leads to the first hydrogen heater 206 which uses the exceptionally low temperature of the boiled-off hydrogen to chill the twice-cooled compressor-cooler coolant to a temperature well below the ambient temperature. The coolant will be colder than would have been achievable with just a normal ram-air radiator cooling of the coolant.

The first hydrogen heater 206 cools and passes the ultra-chilled compressor-cooler coolant through an ultra-chilled compressor-cooler coolant passageway 167, which splits into an intercooler input line 168 and an aftercooler input line 169, leading to the intercooler 203 and aftercooler 205, respectively. Thus, the intercooler and aftercooler are in parallel on this loop, and both receive ultra-chilled coolant that is well below ambient temperature.

The third primary-network cooling loop is the additional-heat-source cooling loop. Cold coolant from the front ram-air heat exchanger 211 passes through a front ram-air heat exchanger exit passageway 171, which is shared with the twice-cooled compressor-cooler coolant passageway 166 and then splits off at a third-loop manifold 183 (which may or may not include a pump controlled by the control system 55) to form a generator inlet passageway 172 that leads to the generator 212. The generator 212 is cooled by the cold coolant from the front ram-air heat exchanger 211, and then passes once-heated additional-source cooling fluid through a once-heated additional-source passageway 173 to aircraft payload devices 213 that require cooling.

The aircraft payload devices 213 are cooled by the once-heated additional-source cooling fluid, and past twice-heated additional-source cooling fluid through a twice-heated additional-source passageway 174 to join with the once-cooled compressor-cooler passageway 165 and the cooled engine-heat coolant passageway 152 to form a complete overlap passageway segment 175. Using a pump 181 that forms a manifold (and may or may not be controllable by the control system 55), the cooled engine-heat coolant passageway 152 splits off, and the twice-heated additional-source passageway 174 continues on through a passageway segment 176, still overlapping with only the once-cooled compressor-cooler passageway 165 to the front ram-air heat exchanger 211.

It may be noted that the complete overlap passageway segment 175 is the only portion of the primary cooling network through which each primary-network cooling loop passes. Thus, if only one pump 181 is to be used to circulate coolant through the primary cooling network, this is a good location for that pump. Nevertheless, the placement of additional pumps, some or all of which are typically controllable by the control system 55, will provide for the control system to regulate heat flow through all three networks such that the efficiency of the powerplant can be maximized. It may also be noted that, in addition to the manifolds explicitly identified herein, there is a manifold 182 (whether pumped or not pumped) at every location in which two or more coolant passageways join or split, and that pumps (controlled or not) may also be located along passageways that do not have manifolds.

In some less-common situations, the coolant flow rate required by the inter-cooler 203 and after-cooler 205 is relatively low. In such cases, the flow of hydrogen through the first hydrogen heater 206 might be able to freeze the slow-flowing coolant that passes heat from the inter- and after-coolers to the first hydrogen heater. To prevent this coolant from freezing in these situations, the air compression system is provided with a blow-off valve 305 (see, FIGS. 1 & 2), that is typically intermediate the aftercooler 205 and the engine 201. When the blow-off valve is opened, it provides a significant pressure drop, and in compensation the compressors must provide additional compression. The additional compression creates additional heat, and thereby causes the inter- and after-coolers to increase their coolant flow, thereby preventing the coolant from being frozen in the first hydrogen heater. The blow-off valve is present along the twice-cooled air passageway 105.

Alternative Embodiments

Figure 3:
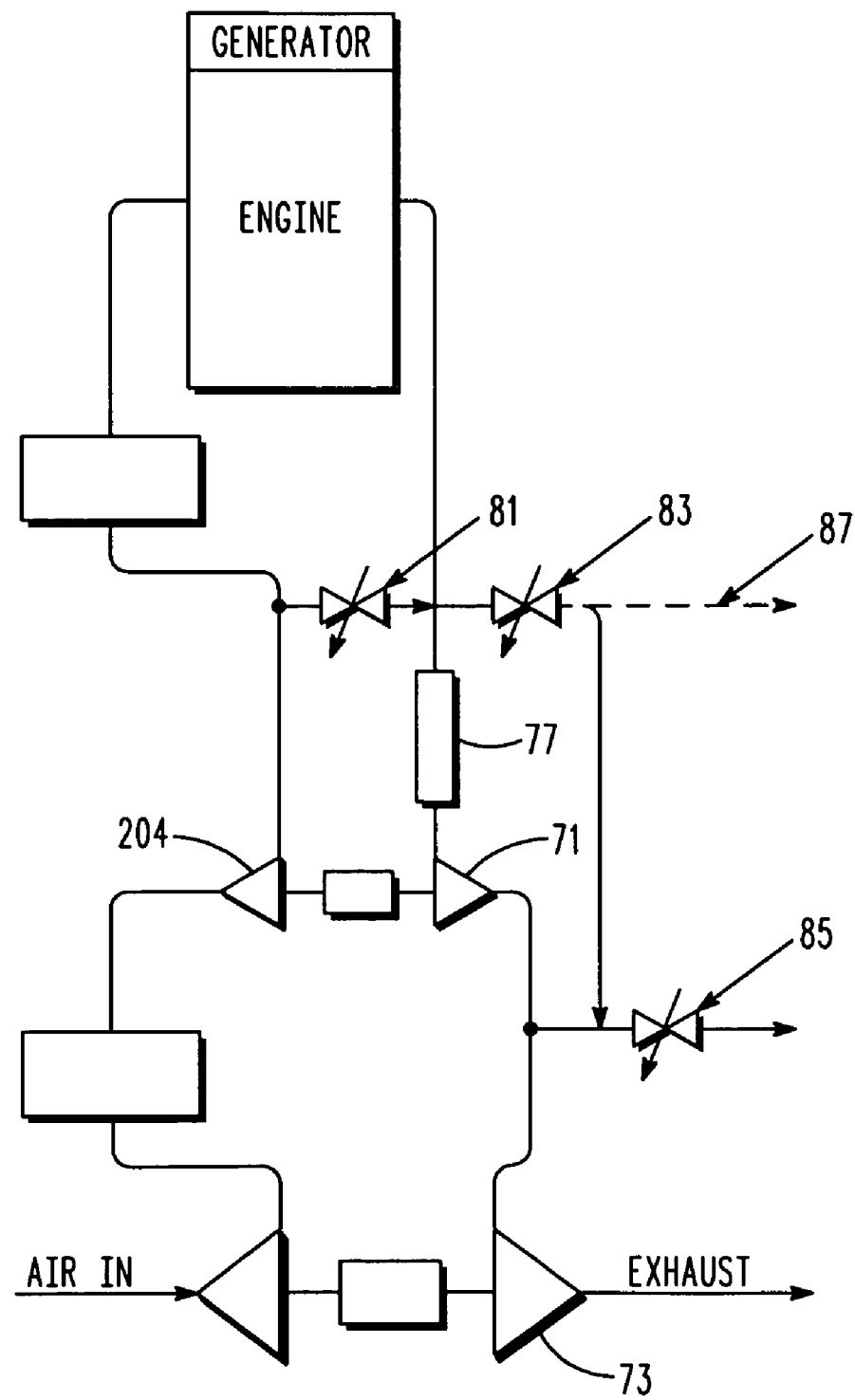
FIG. 3 is a system layout of a powerplant two-stage air compression system for a second embodiment of a powerplant under the invention.

In a second embodiment of the invention, the two-stage air compression system may replace the blow-off valve 305 of the first embodiment with one or more wastegates and/or a bypass valve. More particularly, with reference to FIG. 3, a second embodiment of the invention has all of the elements of the first embodiment except the blow-off valve. It further has an engine bypass port 81 configured to bleed air from the second-turbocharger compressor 204 to the engine exhaust upstream from the afterburner 77. It also has a high-pressure wastegate 83 configured to bleed engine exhaust from upstream of the afterburner 77, around the afterburner and second-turbocharger turbine 71 to the first-turbocharger turbine 73. Finally, it additionally has a low-pressure wastegate 85 configured to bleed air to the atmosphere, bypassing the first-turbocharger turbine 73.

In a third embodiment of the invention, the two-stage air compression system is identical to the second embodiment of the invention, except that the hi-pressure wastegate 83 is configured to bleed air to the atmosphere 87 rather than passing it to the first turbocharger turbine 73. Some variations of the second and third embodiments may be provided with other combinations of the above described blow-off valve 305, engine bypass port 81, and the various wastegates. Because the above described blow-off valve 305 is configured for relatively low-temperature air, it can be configured as a reliable, lightweight device. The second and third embodiments, along with their variations, have pressure relieving devices that must work with significantly hotter air temperatures, and will generally require heavier devices to provide reliable service.

Figure 4:
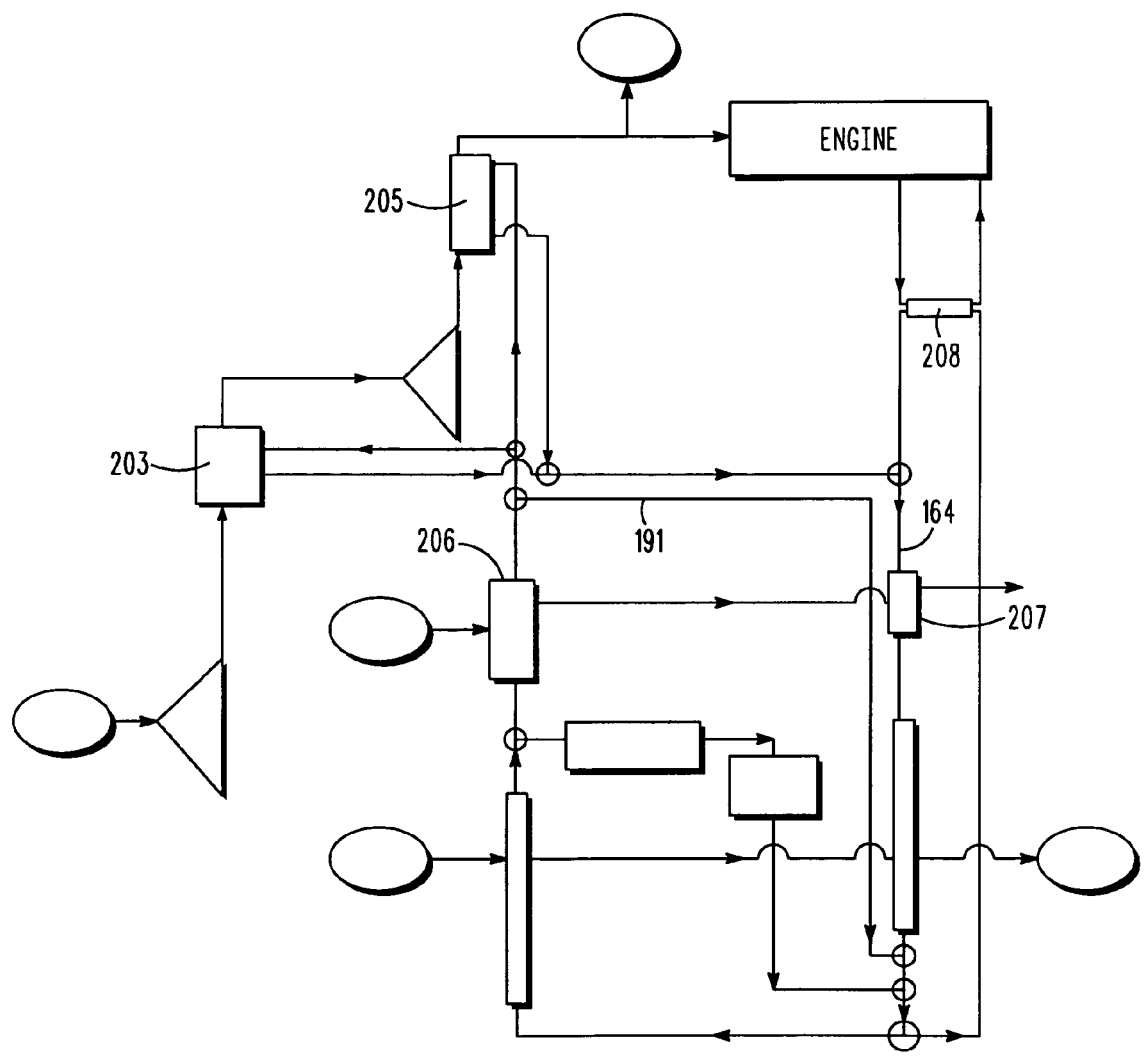
FIG. 4 is a system layout of a cooling system for a fourth embodiment of a powerplant under the invention.

In a fourth embodiment of the invention, the second hydrogen heater is integrated into the primary cooling network, and the third cooling network is thermally isolated from both the primary cooling network and the second cooling network. More particularly, with reference to FIG. 4, the second hydrogen heater 207 is integrated into the rear-ram-air heat exchanger input passageway 164, and is thereby adapted to use hydrogen that has been once cooled by the first hydrogen heater 206 to cool coolant from the intercooler 203, the aftercooler 205, and the engine-coolant heat exchanger 208. Additionally, the coolant-oil heat exchanger 209 has been eliminated. Also, a bypass 191 has been provided to allow adequate hydrogen heating at the first hydrogen heater 206 when the intercooler 203 and aftercooler 205 only require a slow flow of coolant.

Figure 5:
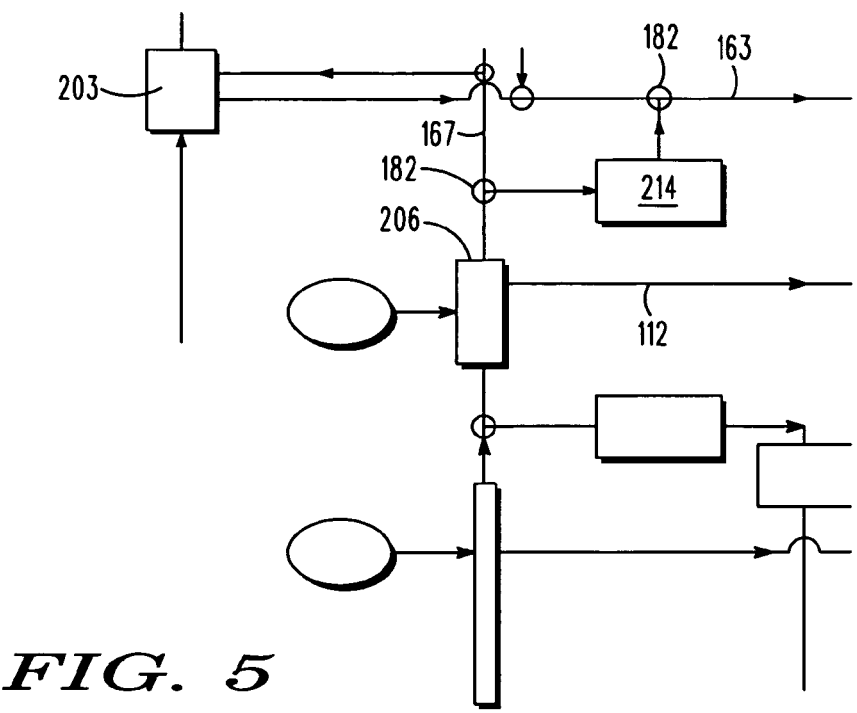
FIG. 5 is a system layout of a portion of a cooling system for a fifth embodiment of a powerplant under the invention.
Figure 6:
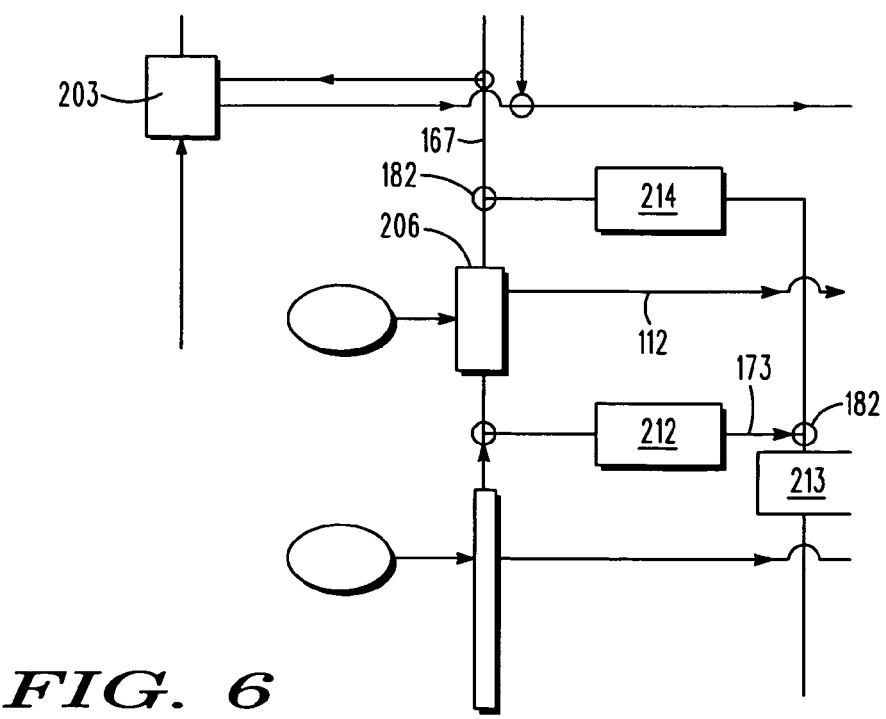
FIG. 6 is a system layout of a portion of a cooling system for a variation of the fifth embodiment of a powerplant partially depicted in FIG. 5.

With reference to FIG. 5, in a fifth embodiment of the invention, a highly cooled payload device 214 such as a low temperature sensor requires cooling using a below-ambient temperature cooling fluid. The ultra-chilled compressor-cooler coolant passageway 167 becomes the split-off point for a separate coolant loop that passes ultra-chilled compressor-cooler coolant through the highly cooled payload device 214, which includes an integral heat exchanger configured to cool the device, and then back into the existing passageways at some temperature-appropriate passageway location, such as the hot compressor-cooler passageway 163. In a variation of this embodiment, the separate coolant loop passes ultra-chilled compressor-cooler coolant through the highly cooled payload device 214, and then back into the existing passageways at a cooler location, such as the once-heated additional-source passageway 173 (see FIG. 6).

Some Aspects of the Embodiment

With respect to FIGS. 1-6, the first hydrogen heater 206 is adapted to uses the exceptionally low temperature of the boiled-off hydrogen to chill the twice-cooled compressor-cooler coolant to a sub-ambient temperature well below the ambient temperature. This ultra-chilled coolant at substantially the sub-ambient temperature is split between the intercooler 203 and aftercooler 205 in parallel, and provides for them to significantly cool the air compressed by the first-turbocharger compressor 202 and the second-turbocharger compressor 204, respectively, without causing a significant pressure drop to the compressed gas.

The front ram-air heat exchanger 211, which is upstream of the first hydrogen heater 206, is configured to cool the coolant to a temperature that is above, but close to the ambient temperature, thereby providing conditions that aid the first hydrogen heater 206 in dropping the coolant temperature well below ambient temperature.

In the case of an aircraft that includes the highly-cooled payload device 214, which has a significant cooling requirement, the aircraft is configured with a highly-cooled payload heat exchanger configured to also use the ultra-cooled coolant from the first hydrogen heater 206 at substantially the sub-ambient temperature to cool the highly-cooled payload device. The highly-cooled payload heat exchanger is typically separate from the intercooler 203 and aftercooler 205, and may be integral with the highly-cooled payload device, as discussed above. Alternatively, it may be an entirely separate heat exchanger (from the highly-cooled payload device) with its own cooling loop.

In another aspect of the invention, the powerplant cooling system employs the front ram-air heat exchanger 211 and the rear ram-air heat exchanger 210, which is downstream of the front ram-air heat exchanger along the ram-air passageway. The front ram-air heat exchanger is downstream of the rear ram-air heat exchanger along the heat-exchanger coolant passageway, such that the front ram-air heat exchanger is configured to further cool coolant received from the rear ram-air heat exchanger.

The coolant manifold 181 downstream along the coolant passageways from the rear ram-air heat exchanger and upstream from the front ram-air heat exchanger splits coolant received from the rear ram-air heat exchanger into a first stream and a second stream. The first stream is directed to the front ram-air heat exchanger, and then eventually on to thermal loads such as the intercooler 203, before returning to the rear ram-air heat exchanger, thus forming a coolant loop that includes both the front ram-air heat exchanger 211 and the rear ram-air heat exchanger 210.

The second stream is directed to the engine-coolant heat exchanger 208 (another thermal load) without passing through the front ram-air heat exchanger first. From the engine-coolant heat exchanger 208, the coolant returns to the rear ram-air heat exchanger 210, thus forming a loop that excludes the front ram-air heat exchanger 211. The engine-coolant heat exchanger 208 operates to cool the engine 201 using a different coolant.

The third-loop manifold 183 also splits coolant received from the front ram-air heat exchanger 211 into a first stream and a second stream. The first stream is directed to the first hydrogen heater 206, and then eventually on to thermal loads such as the intercooler 203, before returning to the rear ram-air heat exchanger 210, and is part of the coolant loop discussed above with reference to the first stream of the coolant manifold 181. That loop includes both the front ram-air heat exchanger 211 and the rear ram-air heat exchanger 210.

The second stream from the third-loop manifold is directed to the generator 212 (another thermal load), and then the coolant returns to the front ram-air heat exchanger 211 without passing through the rear ram-air heat exchanger 210, thus forming a loop that excludes the rear ram-air heat exchanger 210.

In yet another aspect of the invention, the first hydrogen heater 206 heats the hydrogen fuel from the fuel source 302 using heat from the compressor-coolers cooling loop, which includes the intercooler 203 and the aftercooler 205. The second hydrogen heater 207 heats the hydrogen fuel from the first hydrogen heater 206 using heat from the engine-oil cooling loop, or in an alternative embodiment from the engine cooling loop, either of which includes the engine 201 (at least indirectly via the engine-coolant heat exchanger 208). The two loops have a partial thermal independence, in that the intercooler 203 and aftercooler 205 are not on the engine or engine-oil coolant loops, and neither the engine nor the engine-coolant heat exchanger 208 is on the compressor-coolers cooling loop.

The control system 55 is configured to control the operation of the various cooling loops, and does so based on the temperature of the fuel received by the engine to regulate the fuel temperature to a level that is usable by the fuel injectors. Thus, if situations occur in some times of powerplant operation in which there is not enough heat generated by the intercooler and aftercooler to sufficiently warm the hydrogen with the coolant, the engine or engine-oil cooling loops may be used to further heat the fuel.

Fuel Cell Powerplants

The above described embodiments are all based on an internal combustion engine. Aspects of the present invention are also applicable for fuel cell systems, and a similar benefit from the cold hydrogen boil-off gas can to cool compressed oxidizer may be realized.

It should be noted that in the case of a fuel cell, the fuel cell performance requires a certain air pressure at the inlet of the fuel cell rather than a certain density, as with an internal combustion engine. A fuel cell system would likely place more emphasis on reducing the temperature of the air going into a high pressure compressor rather than reducing the temperature of the air going into the fuel cell. Thus, one anticipated fuel cell embodiment would include two serial compressors with an intercooler but not an aftercooler. The intercooler is cooled by a coolant that is cooled in a fuel heater to a below-ambient temperature.

It is to be understood that the invention comprises apparatus and methods for designing powerplants, and for producing powerplants, as well as the apparatus and methods of the powerplant itself. Additionally, the various embodiments of the invention can incorporate various combinations of the above-described features. Moreover, it is contemplated that the claims are broader than the described embodiment.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A powerplant for use in a range of flight conditions, comprising:
    a power converter configured to produce energy from a fuel and an oxidizer;
    a cryogenic fuel source for use by the power converter, the fuel source fuel being configured to provide the fuel at a temperature below ambient temperatures over the range of flight conditions;
    an oxidizer source for use by the power converter, the oxidizer source being configured to provide the oxidizer at a pressure below a desired pressure for use by the power converter;
    a first compressor configured to compress oxidizer from the oxidizer source for use by the power converter;
    a fuel heat exchanger configured to heat fuel from the fuel source and cool a first coolant to a first temperature that is below the ambient temperature; and
    a first-compressor heat exchanger configured to use the first coolant from the fuel heat exchanger at substantially the first temperature to cool the oxidizer intermediate the first compressor and the power converter along a flow path of the oxidizer.

2. The powerplant of claim 1, and further comprising:
    a second compressor intermediate the first-compressor heat exchanger and the power converter along a flow path of the oxidizer, and being configured to compress oxidizer from first-compressor heat exchanger for use by the power converter; and
    a second-compressor heat exchanger configured to use the first coolant from the fuel heat exchanger at substantially the first temperature to cool the oxidizer intermediate the second compressor and the power converter along a flow path of the oxidizer.

3. The powerplant of claim 2, and further comprising a ram-air heat exchanger upstream of the fuel heat exchanger along a flow path of the coolant, and being configured to cool the first coolant to a second temperature that is above the ambient temperature.

4. The powerplant of claim 1, and further comprising a ram-air heat exchanger upstream of the fuel heat exchanger along a flow path of the coolant, and being configured to cool the first coolant to a second temperature that is above the ambient temperature.

5. An aircraft, comprising:
    the powerplant of claim 1; and
    a payload device having a cooling requirement;
    wherein the aircraft is configured with a payload heat exchanger configured to use the first coolant from the fuel heat exchanger at substantially the first temperature to cool the payload device.

6. The aircraft of claim 5, wherein the payload heat exchanger is separate from the first-compressor heat exchanger.

7. An aircraft powerplant cooling system operating with a first coolant, comprising:
    a front ram-air heat exchanger along a ram-air passageway, the front ram-air heat exchanger being configured to cool the coolant;
    a rear ram-air heat exchanger downstream of the front ram-air heat exchanger along the ram-air passageway, the front ram-air heat exchanger being downstream of the rear ram-air heat exchanger along a heat-exchanger coolant passageway such that the front ram-air heat exchanger is configured to further cool coolant received from the rear ram-air heat exchanger;
    a first thermal load downstream of the front ram-air heat exchanger, the first thermal load being configured to receive cooled coolant from the front ram-air heat exchanger, and being configured warm the received coolant and pass the warmed coolant downstream to the rear ram-air heat exchanger;
    a second thermal load; and
    a coolant manifold downstream from the rear ram-air heat exchanger and upstream from the front ram-air heat exchanger, the manifold being configured to split coolant received from the rear ram-air heat exchanger into a first stream directed to the front ram-air heat exchanger and a second stream directed to the second thermal load;
    wherein the second thermal load is configured to receive cooled coolant from the manifold, and to warm the received coolant and pass the warmed coolant downstream to the rear ram-air heat exchanger.

8. The aircraft powerplant cooling system of claim 7, and further comprising a third thermal load, wherein the third thermal load is configured to receive cooled coolant from the front ram-air heat exchanger, and to warm the received coolant and pass the warmed coolant downstream to the manifold.

9. The aircraft powerplant cooling system of claim 7, wherein the second load is a heat exchanger for a power-converter cooling system for a power converter configured to produce energy from a fuel and an oxidizer.

10. The powerplant cooling system claim 9, wherein the power-converter cooling system operates using a second coolant having a higher melting point than the first coolant.

11. A powerplant for use in a range of flight conditions, comprising:
    a power converter configured to produce energy from a fuel and an oxidizer;
    a cryogenic fuel source for use by the power converter, the fuel source fuel being configured to provide the fuel at a temperature below ambient temperatures over the range of flight conditions;
    a first fuel heat exchanger configured to heat fuel from the fuel source using heat from a first cooling loop that includes a first heat source;
    a second fuel heat exchanger configured to heat fuel serially received from the first fuel heat exchanger, the second fuel heat exchanger using heat from a second cooling loop that includes a second heat source; and
    a control system configured to control the operation of the first and second cooling loops based on a temperature of the fuel that is received by the power converter
    wherein the second heat source is not on the first cooling loop, and wherein the first heat source is not on the second cooling loop.

12. The powerplant claim 11, wherein the first heat source derives heat from a compressed gas, and wherein the second heat source derives heat from the power converter.

* * * * *